(12) United States Patent
Thapliyal et al.

(10) Patent No.: US 11,645,998 B2
(45) Date of Patent: May 9, 2023

(54) SYSTEM AND METHOD OF CONTROLLING BRIGHTNESS ON DIGITAL DISPLAYS FOR OPTIMUM AND VISIBILITY AND POWER CONSUMPTION

(71) Applicant: SAMSUNG ELECTRONICS CO., LTD., Suwon-si (KR)

(72) Inventors: Rohit Thapliyal, Noida (IN); Sattdeepan Dutta, Noida (IN); Kushagra K, Noida (IN); Arun Kumar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/731,860

(22) Filed: Apr. 28, 2022

(65) Prior Publication Data

US 2022/0383835 A1     Dec. 1, 2022

Related U.S. Application Data

(63) Continuation of application No. PCT/KR2022/001549, filed on Jan. 28, 2022.

(30) Foreign Application Priority Data

May 18, 2021   (IN) .............................. 202111022216

(51) Int. Cl.
  *G09G 5/10*   (2006.01)
  *G09G 3/20*   (2006.01)
(52) U.S. Cl.
  CPC .............. *G09G 5/10* (2013.01); *G09G 3/2092* (2013.01); *G09G 2320/0626* (2013.01); *G09G 2360/141* (2013.01); *G09G 2360/145* (2013.01)

(58) Field of Classification Search
  CPC ................... G09G 5/10; G09G 3/2092; G09G 2320/0626; G09G 2360/141; G09G 2360/145
  See application file for complete search history.

(56) References Cited

U.S. PATENT DOCUMENTS

2009/0262074 A1  10/2009 Nasiri et al.
2015/0256733 A1*  9/2015 Kanamori .............. G01N 21/21
                                              348/234

(Continued)

FOREIGN PATENT DOCUMENTS

| CN | 106257566 A | 12/2016 |
| CN | 105210117 B | 6/2019 |
| KR | 10-2014-0129619 A | 11/2014 |

OTHER PUBLICATIONS

International Search Report (PCT/ISA/210) dated May 16, 2022 by the International Searching Authority in International Application No. PCT/KR2022/001549.

*Primary Examiner* — Antonio Xavier
(74) *Attorney, Agent, or Firm* — Sughrue Mion, PLLC

(57) ABSTRACT

A system and a method for adjusting brightness of a content are provided. The method includes: receiving a camera feed based on a visible-light; measuring a light sensor value indicating an intensity of the visible-light; detecting a translucent surface over a display screen based on capturing a plurality of visible-light parameters from the camera feed and the light sensor value; predicting a reflectance value of the translucent surface using an artificial neural network model based on the plurality of visible-light parameters and an input brightness level associated with the display screen; determining a proportionality of a change in at least one of a camera feed value and the light sensor value with respect to the input brightness level; verifying the reflectance value through a statistical function based on the determined pro- (Continued)

portionality; and determining an output brightness level for the display screen based on the reflectance value.

14 Claims, 13 Drawing Sheets

(56) References Cited

U.S. PATENT DOCUMENTS

| | | |
|---|---|---|
| 2019/0333473 A1 | 10/2019 | Min |
| 2020/0068689 A1 | 2/2020 | Yoon |
| 2020/0388790 A1 | 12/2020 | Yamazaki et al. |
| 2021/0381970 A1* | 12/2021 | Bern .................. F24S 50/20 |
| 2022/0066078 A1* | 3/2022 | Greene ................ C03C 17/38 |

* cited by examiner

Image

Origin and coordinate selection

SYSTEM AND METHOD OF CONTROLLING BRIGHTNESS ON DIGITAL DISPLAYS FOR OPTIMUM AND VISIBILITY AND POWER CONSUMPTION

CROSS-REFERENCE TO RELATED APPLICATIONS

This application is a bypass continuation application of International Application No. PCT/KR2022/001549, filed on Jan. 28, 2022, which is based on and claims priority under 35 U.S.C. § 119 to Indian Application No. 202111022216, filed on May 18, 2021, in the Indian Intellectual Property Office, the disclosures of which are incorporated by reference herein in their entireties.

BACKGROUND

1. Field

The present disclosure relates to a system and a method for adjusting brightness on digital displays for optimum visibility and power consumption. In particular, the present disclosure relates to a system and a method of optimum brightness calculation for displays with a hindrance object thereupon based on reflectance and transmittance through a hindrance surface as measured based on a Recurrent Neural Network (RNN) learning model.

2. Description of Related Art

A digital surface may include various features, such as displaying a background for digital trace or tracing type of applications. Tracing is an effective tool to understand linear perspective, anatomy and structures. Further, trace drawing is utilized for learning complex art pieces and mode of learning. For example, as shown in FIG. 1A, "Foreshortening" may be performed to visualize how an object looks when projected or extended in space. For example, if you were drawing a figure with an arm stretched out toward you, it would appear "foreshortened". Typically, a user struggles with foreshortening because an outer shape of the object may not appear as expected. Further, as shown in FIG. 1B, existing methods require an additional device to enable trace drawing, use maximum battery for optimal display performance, and/or require using another hand to effectively perform trace drawing or adjust brightness related issues to optimize the brightness. Furthermore, as shown in FIG. 1C, a digital surface utilized as a digital trace drawing requires either to manually adjust brightness which makes the method of digital trace drawing cumbersome and not user-friendly, and thus, the digital trace drawing is less popular among professionals and amateurs. In addition, a handheld device usually requires to be set at maximum brightness in order to ensure the visibility beyond the object like paper on the surface. The user manually adjusting the brightness of a display of the device may drive the display performance at a maximum level, thereby draining the power considerably.

Further, there is a number of applications available which are used for digital tracing. The current state of the art provides, for example, a) calligraphy books for children where calligraphy books provide extensive practice to young kids to learn and develop correct writing methods; b) LED Light Boxes including a light box specially made for tracing. However, it merely provides a light emitting diode (LED) light background for tracing one paper to another. There is no method to control/manage optimal brightness; c) SketchAR where the augmented reality (AR)-based application helps in drawing/sketching. Here, the user has to manually navigate between the AR application and paper while sketching; d) Tracing Paper where the application helps in digitally tracing an image without using any paper. The Tracing Paper application lacks any method to assist in paper sketching or calligraphy. However, none of the arts are widely used due to lack of user-friendliness. In particular, the above-discussed applications do not involve placing paper over a mobile phone for paper tracing. Further, optimal brightness determining appropriate screen brightness is not considered which impacts higher battery energy consumption of the device.

Therefore, there is a need for a mechanism to provide a methodology that can efficiently overcome the aforementioned issues.

SUMMARY

Additional aspects will be set forth in part in the description which follows, and in part, will be apparent from the description, or may be learned by practice of the presented embodiments.

In accordance with an aspect of the disclosure, there is provided a system for adjusting brightness of a displayed content in a device. The system includes: an imaging device for receiving a camera feed based on a visible-light; a light sensor for measuring a light sensor value indicating an intensity of the visible-light; and a brightness calibration module configured to: detect a translucent surface over a display screen based on capturing a plurality of visible-light parameters from the camera feed and the light sensor value; predict a reflectance value of the translucent surface using an artificial neural network model based on the plurality of visible-light parameters and an input brightness level associated with the display screen; determine a proportionality of a change in at least one of a camera feed value and the light sensor value with respect to the input brightness level; verifying the reflectance value through a statistical function based on the determined proportionality; and determining an output brightness level for the display screen based on the reflectance value.

The artificial neural network model further includes: a plurality of convolution layers configured to: convolute raw image data captured by the imaging device to determine a reflected light and a transmitted light for the input brightness level based on the plurality of visible-light parameters; and predict the reflectance value of the translucent surface based on the reflected light; a plurality of logic gates module configured to iteratively fetch and store historical data pertaining to the plurality of visible-light parameters captured by the imaging device and the light sensor, and a plurality of brightness levels; and a feedback-and-cost function module configured to verify the predicted reflectance value based on a cost function acting as the statistical function.

At least one condition of the cost function is determined according to at least one of: a combination of the reflected light and the transmitted light resulting back into a raw image; and a ratio of a change in the input brightness level that is proportional to a ratio of a change in the reflected light.

The cost function is further determined based on: calculating a delta through an adder based on an execution of the at least one condition; and using the artificial neural network model to iteratively predict a revised reflectance of the translucent surface for minimizing the delta computed by the adder.

The brightness calibration module is further configured to: calculate a transmittance value of the translucent surface based on the reflectance value; determine an optimal brightness level for the display screen as the output brightness level based on at least one of the transmittance value and the reflectance value; and adjust display properties of the display screen based on the optimal brightness level.

The system further includes a co-ordinate selection module configured to: detect a movement of the translucent surface on the display screen; calculate an offset value due to the movement of the translucent surface with respect to the display screen; and adjust the displayed content on the display screen based on the offset value.

The co-ordinate selection module further includes: an image scalar module configured to: receive a paper size and an aspect ratio of a digital image to be traced; and scale the digital image based on a predefined aspect ratio of the display screen; an origin and alignment selection module configured to: notify a user for placing the display screen at a corner of the translucent surface; select a coordinate as an origin based on a position of the corner of the translucent surface; select one or more coordinates as alignment coordinates based on the movement of the translucent surface; and an alignment confirmation module configured to: notify the user to adjust an alignment of the display screen based on the movement of the translucent surface with respect to the display screen, wherein the digital image to be traced is adjusted with respect to the display screen based on the offset value.

In accordance with an aspect of the disclosure, there is provided a method for adjusting brightness of a displayed content in a device. The method includes: receiving a camera feed based on a visible-light; measuring a light sensor value indicating an intensity of the visible-light; detecting a translucent surface over a display screen based on capturing a plurality of visible-light parameters from the camera feed and the light sensor value; predicting a reflectance value of the translucent surface using an artificial neural network model based on the plurality of visible-light parameters and an input brightness level associated with the display screen; determining a proportionality of a change in at least one of a camera feed value and the light sensor value with respect to the input brightness level; verifying the reflectance value through a statistical function based on the determined proportionality; and determining an output brightness level for the display screen based on the reflectance value.

The predicting the reflectance value of the translucent surface using the artificial neural network model includes: convoluting raw image data captured by an imaging device to determine a reflected light and a transmitted light for the input brightness level based on the plurality of visible-light parameters; and predicting the reflectance value of the translucent surface based on the reflected light; iteratively fetching and store historical data pertaining to the plurality of visible-light parameters captured by the imaging device and the light sensor and a plurality of brightness levels; and verifying the predicted reflectance value based on a cost function acting as the statistical function.

At least one condition of the cost function is determined according to at least one of: a combination of the reflected light and the transmitted light resulting back into raw image; and a ratio of a change in the input brightness level that is proportional to a ratio of a change in the reflected light.

The cost function is determined based on: calculating a delta through an adder based on an execution of the at least one condition; and using the artificial neural network model to iteratively predict a revised reflectance of the translucent surface for minimizing the delta computed by the adder.

The method further includes: calculating a transmittance value of the translucent surface based on the reflectance value; determining an optimal brightness level for the display screen as the output brightness level based on at least one of the transmittance value and the reflectance value; and adjusting display properties of the display screen based on the optimal brightness level.

The method further includes: detecting a movement of the translucent surface on the display screen; calculating an offset value due to the movement of the translucent surface with respect to the display screen; and adjusting the displayed content on the display screen based on the offset value.

The method further includes: receiving a paper size and an aspect ratio of a digital image to be traced; scaling the digital image based on a predefined aspect ratio of the display screen; notifying a user for placing the display screen at a corner of the translucent surface; selecting a coordinate as an origin based on a position of the corner of the translucent surface; selecting one or more coordinates as alignment coordinates based on the movement of the translucent surface; and notifying the user to adjust alignment of the display screen based on the movement of the translucent surface with respect to the display screen, wherein the digital image to be traced is adjusted with respect to the display screen based on the offset value.

BRIEF DESCRIPTION OF THE DRAWINGS

The above and other features, aspects, and advantages of certain embodiments of the present disclosure will be more apparent from the following description taken in conjunction with the accompanying drawings, in which.

Figure 1A:
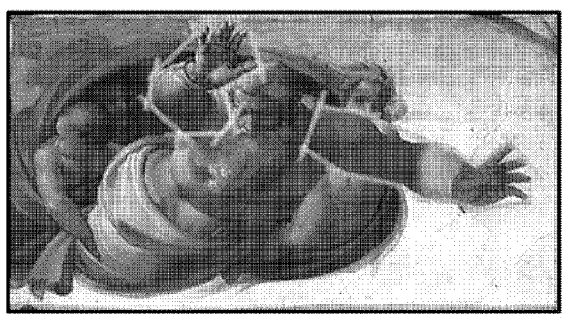
FIGS. 1A, 1B, and 1C illustrate diagrams of trace drawing in the related art s.
Figure 1C:
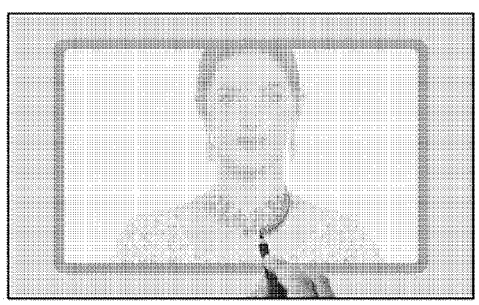
Figure 1B:
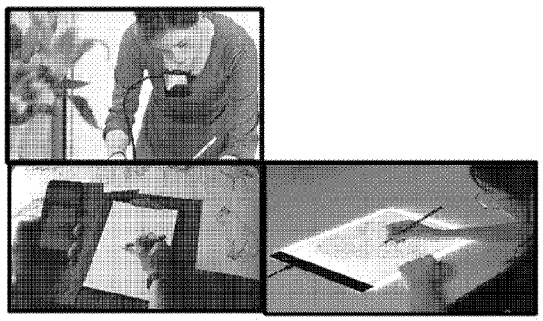

A person skilled in the art will appreciate that elements illustrated in the accompanying drawings are illustrated for simplicity and may not be drawn to scale. For example, the flowcharts illustrate one or more methods in terms of prominent steps to help understanding of various aspects of the present disclosure. Furthermore, in terms of a device and a system, one or more components of a device may be shown, however, the accompanying drawings may show only those specific details that are pertinent to understanding the embodiments of the present disclosure so as not to obscure the understanding of the embodiments.

DETAILED DESCRIPTION

It should be understood that, although illustrative implementations of the embodiments of the present disclosure are described below, the embodiments of the present disclosure may be implemented using any number of techniques that are currently known or in existence. The present disclosure should in no way be limited to the illustrative implementations, drawings, and techniques described below, including the exemplary design and implementation illustrated and described herein, but may be variously modified within the scope of the appended claims.

The terminology and structure described herein is for describing one or more embodiments, and specific features and elements should not be construed as limiting the scope of the disclosure.

More specifically, any terms used herein such as, but not limited to, "include," "comprise," "has/have," "consist," and grammatical variants thereof may not specify an exact limitation or restriction and certainly do not exclude possible variations of one or more features or elements, unless indicated otherwise. Moreover, the one or more embodiments should not be construed as excluding the possible removal of one or more of the listed features and elements, unless indicated otherwise.

Whether or not a certain feature or element was limited to being used only once, either way it may still be referred to as "one or more features" or "one or more elements" or "at least one feature" or "at least one element." Furthermore, the use of the terms "one or more" or "at least one" feature or element do not preclude there being none of that feature or element, unless indicated otherwise.

Unless otherwise defined, all terms, and especially any technical and/or scientific terms, used herein may be taken to have the same meaning as commonly understood by one having an ordinary skill in the art.

The present disclosure provides a system and method for adjusting brightness on digital displays for optimum visibility and power consumption. In particular, the present disclosure relates to a system and a method of optimum brightness calculation for displays with hindrance objects thereupon based on reflectance and transmittance through the hindrance surface as measured based on RNN learning model. Also, the present disclosure allows display content adjustment with respect to a device moment in order to perform techniques such as trace drawing.

Embodiments of the present disclosure will be described below in detail with reference to the accompanying drawings.

Figure 2:
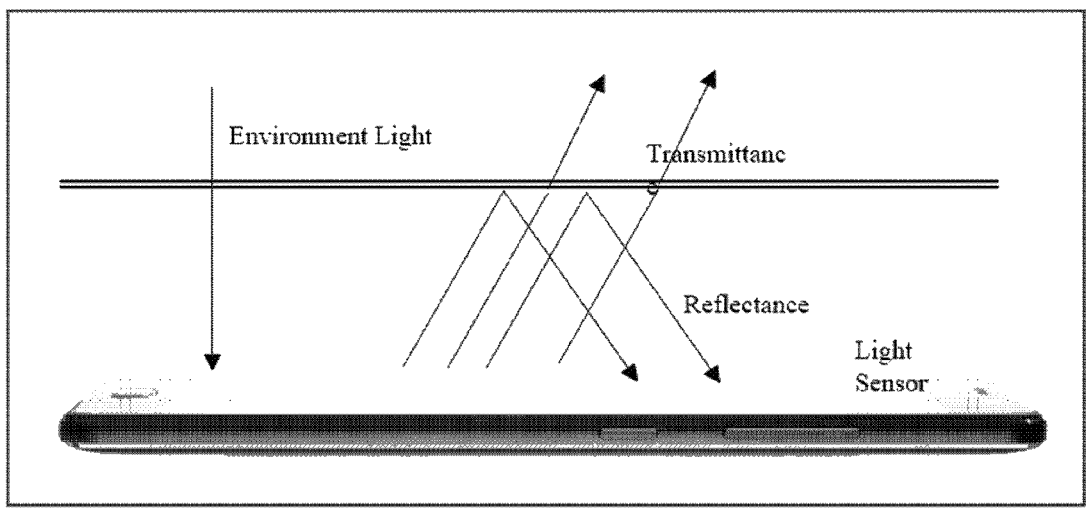
FIG. 2 is a diagram illustrating a relationship between a variation in brightness of a screen display with respect to a light reflected and transmitted when a translucent object is placed over a screen, according to an embodiment.

According to one aspect of the present disclosure, there exists a relationship between a variation in brightness of screen display with respect to a light reflected and transmitted when a translucent object, like a piece of paper, is placed over a screen as shown in FIG. 2. This relationship may be used to determine an optimal screen brightness level and overall savings in energy consumption by the device. In particular, as shown in FIG. 2, when environmental light falls on the surface of the display screen, some part of the light is transmitted that may be calculated as transmittance and some other part of the light is reflected that may be calculated as reflectance. Thus, by calculating the transmittance and the reflectance, an optimal brightness level can be calculated. The implementation details of the brightness calibration will be discussed in detail below.

Figure 3:
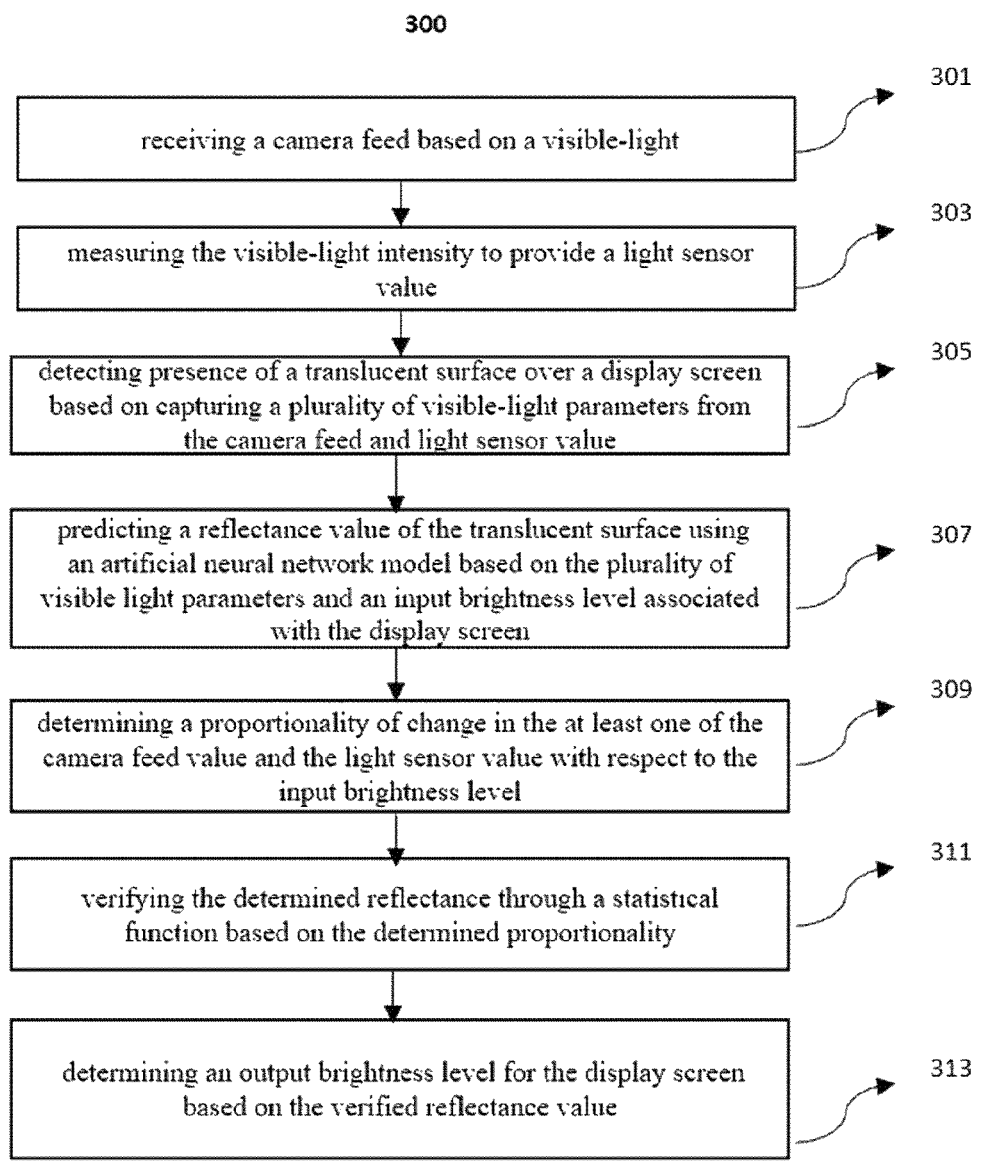
FIG. 3 is a flowchart illustrating a method for adjusting brightness of displayed content in a device according to an embodiment.

FIG. 3 is a flowchart illustrating a method for adjusting brightness of displayed content in a device according to an embodiment.

In an implementation as depicted in FIG. 3, the present subject matter refers to a method for adjusting the brightness of the displayed content in a device.

The method 300 includes receiving, from an imaging device, a camera feed based on visible light (operation 301). As an example, the imaging device may be a device capable of capturing an image like in cameras that are in-built in a handheld device. For example, the handheld device can be a mobile phone (e.g., a cellular phone, a phone running on a local network, or any other telephone handset), a wired telephone (e.g., a phone attached by a wire), a personal digital assistant (PDA), a video game player, a video game controller, navigation device, a mobile internet device (MID), a personal navigation device (PND), a digital still camera, a digital video a camera, a binoculars, a telephoto lens, a portable music, video, or a media player, a remote control, or another handheld device, or a combination of one or more of these devices. In addition, the camera feed may be due to environment light or may be due to phone brightness that is incident upon a surface of a display screen of the imaging device/handheld device.

In operation 303, a light sensor measures the visible-light intensity to provide a light sensor value. In operation 305 the brightness calibration module detects the presence of a translucent surface over the display screen based on capturing a plurality of visible light parameters from the camera feed and light sensor value. As an example, the visible light parameters may be a reflected light as reflectance, transmitted light as a transmittance, and the like. In operation 307, the brightness calibration module predicts a reflectance value of the translucent surface using an artificial neural network model based on the plurality of visible light parameters and an input brightness level associated with the display screen.

In operation 309, after predicting the reflectance value at step 307 by the artificial neural network, the brightness calibration module determines a proportionality of change in at least one of the camera feed values and the light sensor values with respect to the input brightness level. In operation 311, the brightness calibration module verifies the determined reflectance value through a statistical function based on the determined proportionality.

In an embodiment, the brightness calibration module includes the artificial neural network. The artificial neural network includes one or more convolution layers. The prediction of the reflectance value of the translucent surface using the artificial neural network of operation 307, includes convoluting, by the one or more convolution layers, raw image data captured by the imaging device by resolving the plurality of visible light parameters into reflected light and transmitted light for the input brightness level. The one or more convolution layers predict the reflectance value of the translucent surface based on the reflected light. In another embodiment, the artificial neural network includes a plurality of logic gates module to iteratively fetch and store historical data pertaining to the plurality of visible light parameters captured by the imaging device and the light sensor, and a plurality of brightness level. The artificial neural network further includes a feedback-and-cost function module. The feedback-and-cost function module verifies the predicted reflectance value based on satisfaction of a cost function acting as the statistical function.

In an embodiment, the cost function may be determined according to at least one of a) a combination of the reflected light and the transmitted light of the raw image; or b) a ratio of a change in the input brightness level that is proportional to a ratio of a change in the reflected light.

According an embodiment, the cost function may be derived by calculating a delta through an adder module based on the execution of at least one condition and then using the neural network to iteratively predict a revised reflectance of the translucent surface for minimizing the delta computed by the adder.

In operation 313, the brightness calibration module determines an output brightness level for the display screen based on the verified reflectance value.

In addition, the method 300 calculates, by the brightness calibration module, a transmittance value of the translucent surface based on the determined reflectance value. The brightness calibration module determines an optimal brightness level for the display screen as the output brightness level based on at least one of the calculated transmittance values and the determined reflectance value. Thus, the brightness calibration module adjusts the display properties of the display screen based on the determined optimal brightness level.

The method 300 further includes detecting, by a co-ordinate selection module, a movement of the translucent surface on the display screen. The co-ordinate selection module calculates an offset value based on the movement of the translucent surface with respect to the display screen and adjusting a displayed content at the display screen based on the calculated offset value.

The method 300 further includes receiving a paper size and an aspect ratio of a digital image to be traced. The reception of the paper size and the aspect ratio of a digital image to be traced is performed by an image scalar module included in the co-ordinate selection module. Thereafter, the digital image is scaled based on a predefined aspect ratio of the display screen.

The method 300 further includes notifying, by an origin and alignment selection module that is included in the co-ordinate selection module, a user to adjust the display screen based on a corner of the translucent surface. Thus, upon notification the origin and alignment selection module selects one or more coordinates as an origin based on the position of the corner and selects one or more coordinates as alignment coordinates based on the movement of the translucent surface. Thereafter, an alignment confirmation module which is included in the co-ordinate selection module notifies the user to adjust the alignment of the display screen based on the movement of the translucent surface with respect to the display screen. Thus, the digital image which is to be traced is adjusted with respect to the display screen based on the calculated offset.

Figure 4:
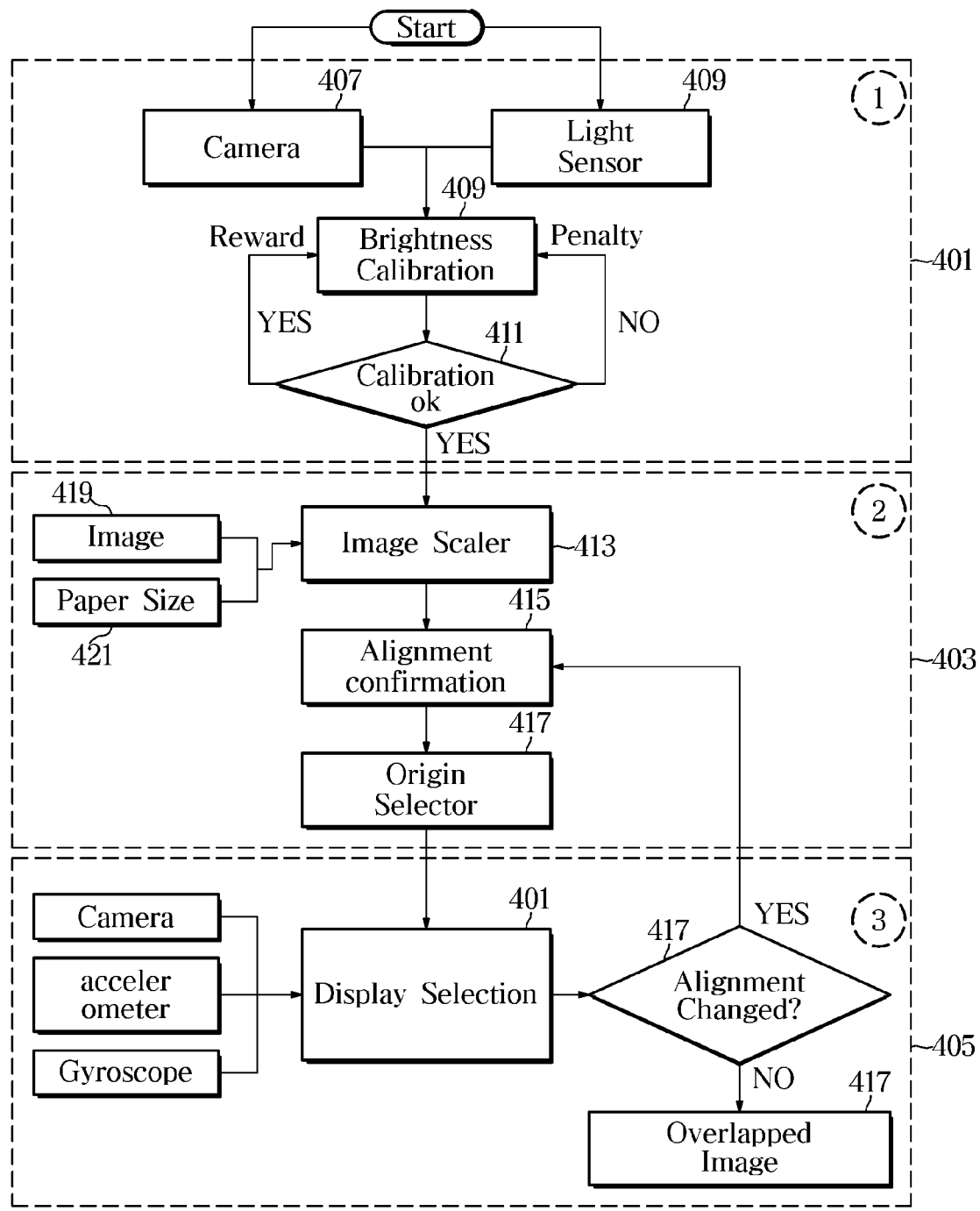
FIG. 4 is a flow diagram illustrating a detailed implementation of a method of FIG. 3, according to an embodiment.
Figure 5:
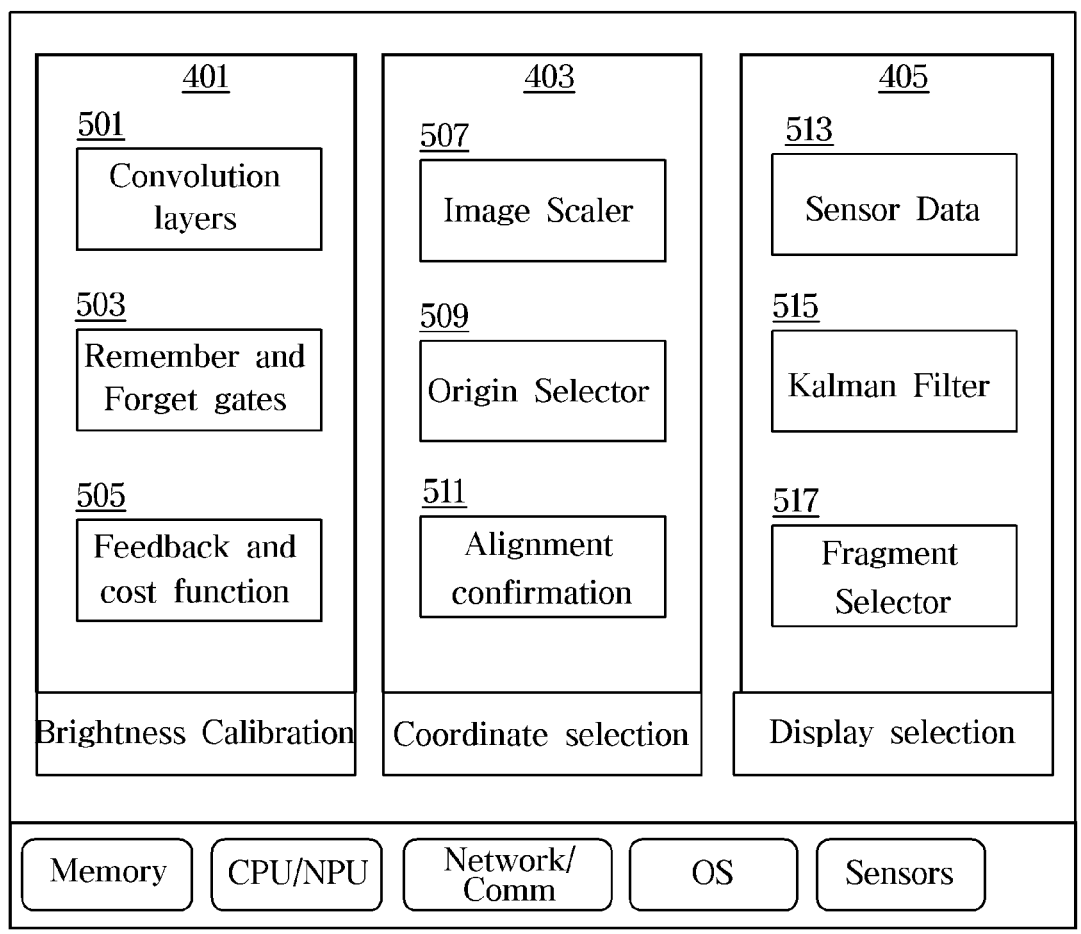
FIG. 5 is a diagram illustrating a system architecture according to an embodiment.
Figure 6:
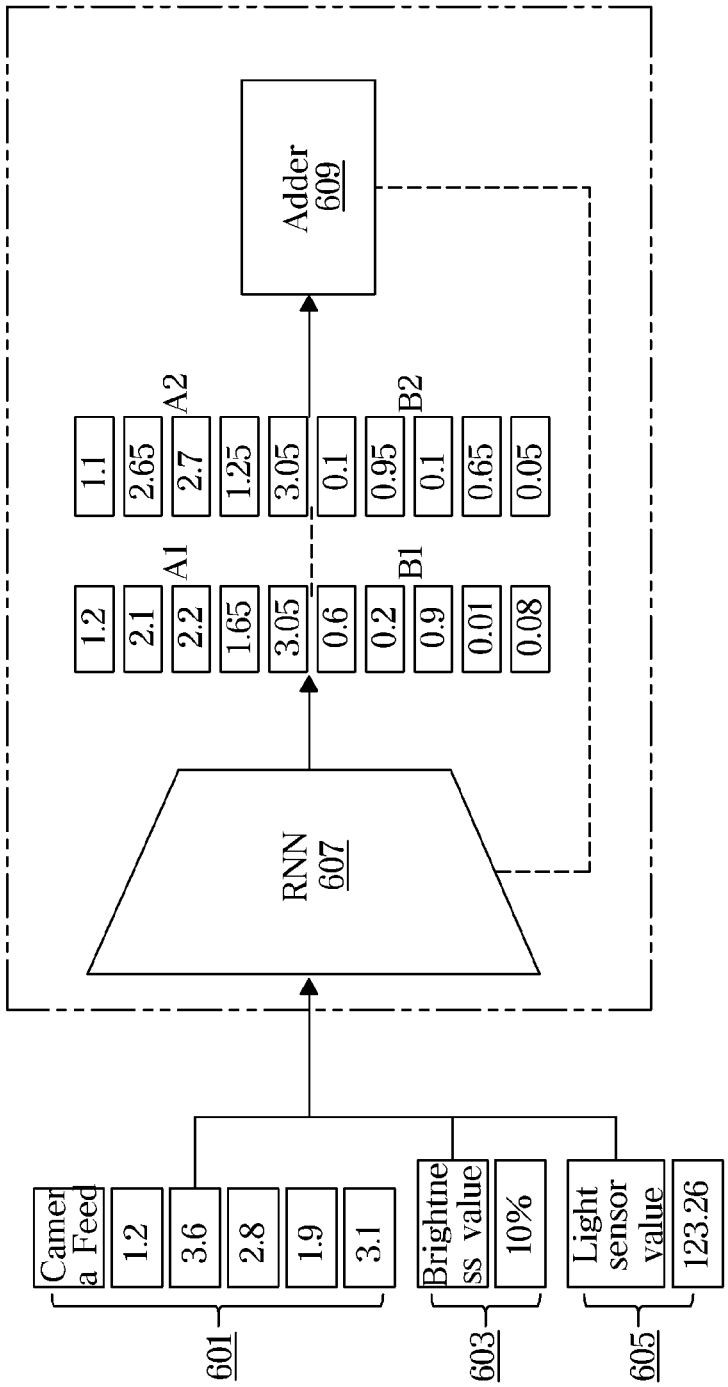
FIG. 6 illustrates an example of training an RNN module, according to an embodiment.

Referring to FIGS. 4 to 6, the method 300 of FIG. 3 will be described in more detail below. FIG. 4 is a flow diagram illustrating a detailed implementation of the method 300 of FIG. 3, according to an embodiment. Referring to FIG. 4, the method 300 may be implemented in a three major block of implementation. Block 1 represents a corresponding operation flow of Brightness Calibration Module 401, block 2 represents a corresponding operation flow of Co-ordinate selection module 403, and block 3 represents a corresponding operation flow of Display Selection module. The implementation details of each of the modules is shown in a system architecture in FIGS. 5 and 6. Similar reference numerals denoting corresponding features are consistently used throughout the figures for the sake of brevity in the embodiments.

Referring to FIG. 4, oeprations 407 and 409 correspond to the operations 301 and 303 of FIG. 3. That is, the camera receives the camera feed based on the visible light and the light sensor measures the visible-light intensity to provide a light sensor value. The camera feed value 601 and the light sensor value 603 (as shown in FIG. 6) are provided to the Brightness Calibration Module 401 for brightness calibration at operation 409. Additionally, some amount of brightness value 603 is also considered as an input to the Brightness Calibration Module 401.

According to an embodiment, the Brightness Calibration Module 401 includes the artificial neural network. In particular, the Brightness Calibration Module 401 is a Recurrent Neural Network (RNN) based artificial neural network module. The Brightness Calibration Module 401 includes one or more convolution layers 501, Remember and Forget Gates 503, and Feedback and Cost function 505. The Brightness Calibration Module 401 performs operations 305 to 313 of FIG. 3 operation. Accordingly, the descriptions provided above with respect to operations 305 to 313 will be omitted.

In an implementation, the RNN based Brightness Calibration Module 401 predicts the optimum brightness required for visibility after a tracing paper is placed (as described in operation 305 of FIG. 3) on top of the handheld device. In particular, the brightness calibration module 401 uses the RNN 607 to separate the FOV into a reflected vector and transmitted vector based on the reflectance of the medium being calculated (as described in operation 307 FIG. 3). It uses multiple iterations of light sensor and camera FOV data to calculate the proportionality of change in the camera feed value and the light sensor value with respect to the input brightness level. That is Brightness Calibration Module 401 determines proportionality constant of ratio of increase in reflected light from the handheld device with an increase in brightness of device (as described in operation 309 of FIG. 3).

Accordingly, the convolution layer 501 is a preprocessing layer of the model that decreases the complexity by convoluting the raw image data provided as input. In addition, there can be one or more convolution layers 501. In an implementation, the convolution of the raw image data captured by the imaging device may be performed by resolving the plurality of visible light parameters into reflected light and a transmitted light for the input brightness level and thereafter, predicting the reflectance value of the translucent surface based on the reflected light.

Subsequent to the prediction of the reflectance value, the Remember and Forget Gates 503 which are logic section of the Brightness Calibration Module 401 undergoes through multiple records of light sensor and FOV data with respect to brightness level. For any specific iteration, model remembers the value which predicts the data better and forgets the value for which there is a data mismatch. In particular, the Remember and Forget Gates 503 may be configured to iteratively fetch and store historical data pertaining to the plurality of visible light parameters captured by the imaging device and the light sensor and a plurality of brightness level. That is, during the iteration processing, the Remember and Forget Gates 503 may maintain data that is greater than or equal to a predetermined threshold and uses the maintained data to predict the brightness level for the next iteration. The Remember and Forget Gates 503 may discard or not use data that is less than the predetermined threshold for the next iteration.

Subsequently, the Feedback and cost function module 505 at operation 411 of FIG. 4 may be configured to verify (as described in operation 311 of FIG. 3) the predicted reflectance value based on satisfaction of a cost function acting as the statistical function. In particular, to satisfy the objective of the cost function following conditions are checked:

a) A combination of the reflected light and the transmitted light to result back into the raw image. In particular, the vectors separated as transmitted and reflected light must combine to form the input image: Cost function for this condition will be the difference in the sum of separated vectors with respect to the input vector as defined in equation 1.

$$\sum_{i=1}^{N}(Ii - (A_i + Bi))^2 \tag{1}$$

Where, $A_i$=input reflected light and $B_i$=input transmitted light b) Ascertaining if a ratio of change in the input brightness level is proportionate to a ratio of change in the reflected light. In particular, the ratio of change in reflected light should be proportional to the change in brightness: The cost function for this condition is the difference between the ratio of change in brightness to change in reflected light with a constant 'K' as defined in the equation 2.

$$\frac{1}{N}\sum\left(\frac{B(i+1, j)}{B(i, j)} - K\right)^2 \tag{2}$$

Where, B=input brightness level,
K=Proportionality constant

Thereby, determining (as described in operation 313 of FIG. 3) an output brightness level for the display screen based on the verified reflectance value.

FIG. 6 illustrates an example of training the RNN module, according to an embodiment. Accordingly, the RNN determines the reflectance of the paper by repeatedly matching the relation of change in the camera feed and light sensor values with respect to change in the brightness level of an electronic device. Since the paper with similar reflectance will behave similarly, the RNN remembers the significant patterns to determine the reflectance of the paper. The RNN tries to separate camera feed to external transmitted light and internally reflected values for multiple brightness levels in the device. To verify the same, the sum of those values is checked against the original image.

It is assumed that the total light being received by the camera be P, then P=t1+r2, where t1 is the light transmitted from the external environment and r2 is light reflected from the screen of the electronic device given some external brightness Bi, and the transmittance+reflectance=1. Here, more reflectance means more light to the camera feed. Also, the input to camera feed and light sensor will be proportional to the brightness level of the display, and since more brightness means more light from the electronic device, the light in the camera feed and light sensor values will increase based on the reflectance of the paper.

For the same change brightness level and environment light, the paper with more reflectance will more light being reflected and hence more light in the camera feed and light sensor. Using this relation, the RNN based model can be trained based on input the light sensor value, camera feed, and brightness level of the device. During the training phase, RNN takes multiple iterations of camera feed and light sensor data for every brightness level. The optimization function for the RNN is made to remember the patterns for a change in light with respect to brightness and based on that determine the reflectance of the electronic device. Then, based on environment light and reflectance, the optimal brightness level is calculated and set to the device.

Thus, from the above is known that that reflected light from paper is proportional to the brightness. as defined in equation 3.

$$Bk/Bi = K*(Rk/Ri) \tag{3}$$

Accordingly, the cost function may be defined by calculating delta through an adder module 609 based on the execution of at least one condition at equation 1 and 2 and collaboratively defined as below in equation 4:

Cost function (delta)

$$= \sum_{i=1}^{N}(Ii - (A_i + Bi))^2 + \frac{1}{N}\sum\left(\frac{B(i+1, j)}{B(i, j)} - K\right)^2 =, \tag{4}$$

where

Additionally, calculation of 'K' from light sensor data is given by equation 5 as below:

$$\left(\frac{B_{i+1}}{B_i} = k\frac{R_{i+1}}{R_i}\right) \text{ where, } R_i = \frac{L_{i+1} - L_i}{(2k - 1)B_i} \tag{5}$$

Accordingly, to summarize, the RNN predicts "a reflectance of paper" that may be iteratively calculated as output. This also satisfies the "cost function criteria" (based on proportion k). Once the reflectance of the paper is iteratively predicted, the optimal brightness level may be calculated as the final output.

In a further implementation, the Brightness Calibration Module 401 calculates a transmittance value of the translucent surface based on the determined reflectance value as described with respect to FIGS. 4 to 6. The Brightness Calibration Module 401 determines an optimal brightness level for the display screen as the output brightness level based on at least one of the calculated transmittance value and the determined reflectance value. In particular, the transmittance is actually the light that has passed through the surface and so can be calculated based on reducing reflectance calculated in the previous step from the total light. Different hindrance objects may change this factor differently based on their characteristics. Thus, adjusting display properties of the display screen based on the determined optimal brightness level. Thus, calculating the optimal brightness level helps in reducing the battery consumption by determining an optimal brightness level instead of a fixed brightness level.

Referring back to FIG. 4, block 2 represents the corresponding operation flow of co-ordinate selection module 403. According to an embodiment, the coordinate selection module 403 includes an image scalar 507, an origin selector 509, and alignment confirmation 511. The co-ordinate selection module 403 provides functionality of a selection of an appropriate co-ordinate system and origin based on which the position and alignment of the device is calculated. This module also constantly monitors the displacement and rotation of the phone and confirms if it matches with the original alignment to aid in precise tracing.

In an implementation, the co-ordinate selection module 403 prompts or notifies the user to provide the paper size and aspect ratio of the digital image being traced and choose a starting location and an alignment of the device before tracing starts. This module takes scales the mentioned image and chooses an origin (generally starting point of the device) and a co-ordinate system to describe the position and orientation of the device. It also prompts the user to realign if alignment mismatches during tracing.

Figure 7A:
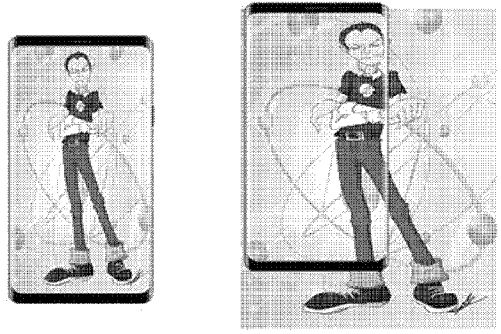
FIGS. 7A, 7B, and 7c illustrate an example operation of a coordinate selection module, according to an embodiment.

Referring to the FIG. 4, at operations 419 and 421, the image scaler module 507 receives a paper size and an aspect ratio of the digital image as input, and a paper size and an aspect ratio of the image to be traced. Based on the received paper sizes and the aspect ratios, the image scaler module 507 scales the digital image to the intended aspect ratio and size as shown in FIG. 7A.

Figure 7C:
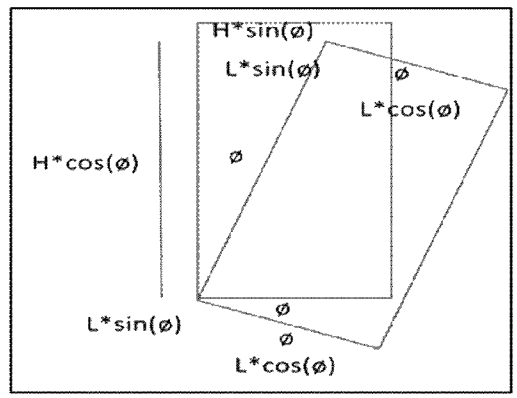
Figure 7B:
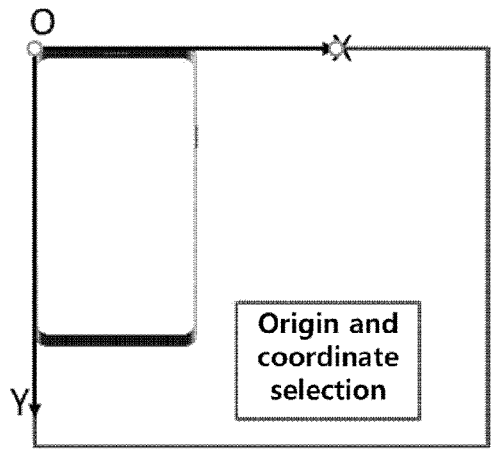

The Origin selection module 509 prompts or notifies the user to place the electronic device on one corner as shown in FIG. 7B and remembers the selected position as origin and alignment as co-ordinate system. The selected position is later used in describing the position and alignment of the device by a display the selector module.

At operation 415, the Alignment confirmation module 511 monitors the movement of the device and prompts user to fix alignment if a mismatch occurs for precise tracing (operation 417). To detect mismatch, a given percentage of the display section should overlap in two successive positions and alignment of the electronic device (operation 417). Upon confirmation of the fix alignment the Origin selection module 509 provides a coordinate of the selected origin to a display selection 405.

In an implementation, the display selection 405 includes sensor data 513, Kalman filter 515, and fragment selector 517. Accordingly, the display selection 405 calculates the position and orientation of the device using sensors data of accelerometer, gyroscope, or camera feed and based on that it selects the segment of the image to be displayed on the screen.

The new coordinates data for the display may be calculated based on the below equation and as shown in FIG. 7C:

Translation:

$$X\text{new}=X\text{prev}+X\text{(0 if }X\text{new}<0\text{, else min(Paper Length, }X\text{new))} \quad (6)$$

$$Y\text{new}=Y\text{prev}+Y\text{(0 if }Y\text{new}<0\text{, else min(Paper height, }Y\text{new))} \quad (7)$$

Rotation:

$$X1_{new}=X1_{prev}+H^*\sin(\emptyset)\ (0\text{ if }X1_{new}<0\text{, else min(Paper Length, }X_{new})) \quad (8)$$

$$Y1_{new}=Y1_{prev}+H(1-\cos(\emptyset)\ (0\text{ if }Y_{new}<0\text{, else min (Paper height, }Y_{new})) \quad (9)$$

$$X2_{new}=X1_{new}+L^*\cos(\emptyset)\ (0\text{ if }X2_{new}<0\text{, else min(Paper Length, }X2_{new}) \quad (10)$$

$$Y2_{new}=Y2_{prev}+L^*\sin(\emptyset)\ (0\text{ if }Y_{new}<0\text{, else min(Paper height, }Y_{new})) \quad (11)$$

$$X3_{new}=X3_{prev} \quad (12)$$

$$Y3_{new}=Y3_{prev} \quad (13)$$

$$X4_{new}=X3_{new}+L^*\cos(\emptyset)\ (0\text{ if }X_{new}<0\text{, else min(Paper Length, }X_{new}) \quad (14)$$

$$Y4_{new}=Y3_{prev}+L^*\sin(\emptyset)\ (0\text{ if }Y_{new}<0\text{, else min(Paper height, }Y_{new})) \quad (15)$$

Further, the mathematical derivation is given as below:

$$\dot{A}=\dot{A}x+\dot{A}y+\dot{A}z\text{(components of accleration vector)}$$

Integrating acceleration vector will give us the velocity vector $$\int\dot{A}dt=\int(\dot{A}x+\dot{A}y+\dot{A}z)dT$$

$$\int\dot{A}dT=\dot{Y}x+\dot{Y}y+\dot{Y}z+\text{constant }(\dot{Y}k\text{ are components of the velocity vector})$$

Integrating velocity vector will give us the displacement vector $$\int\dot{Y}dt=\int(\dot{Y}x+\dot{Y}y+\dot{Y}z)dT$$

$$\int\dot{Y}dT=\dot{S}x+\dot{S}y+\dot{S}z+\text{constant }(\dot{S}k\text{ are conponents of displacement vector})$$

$$\dot{S}=\dot{S}x+\dot{S}y+\dot{S}z\ \text{(Final displacement vector)}$$

Figure 8A:
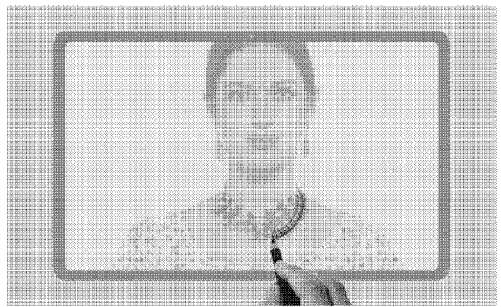
FIGS. 8A to 11 illustrate various example images, according to an embodiment.
Figure 8B:
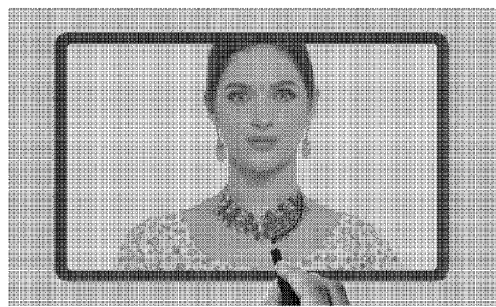

Now, various use cases for implementing mechanisms as disclosed above will be disclosed. FIG. 8A illustrates a digital image obtained by using the related art in which a sheet is placed over a digital display in order to trace or draw a digital image. In the related art, it would require a high brightness device which could lead to drain a huge amount of battery, and thus, would not be efficient. In contrast, referring to FIG. 8B, a digital image obtained according to the one or more embodiments of the disclosure, a device can learn on its own to adjust the display brightness with respect to the sheet thickness used in order to make the digital display image clearly visible over the sheet and enable the user to efficiently do the trace drawings.

Figure 9A:
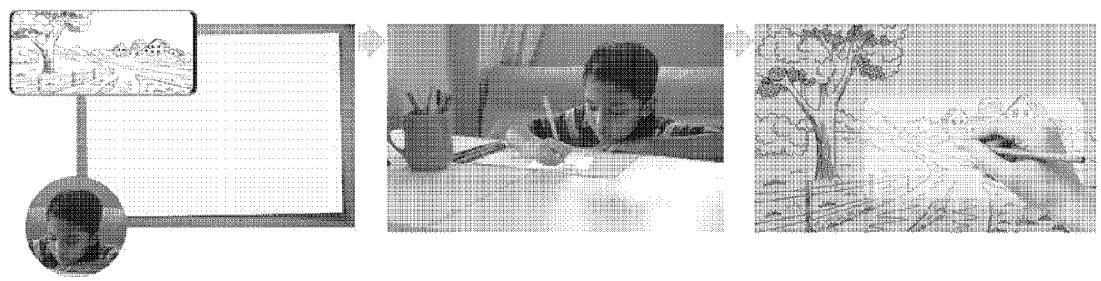
Figure 9B:
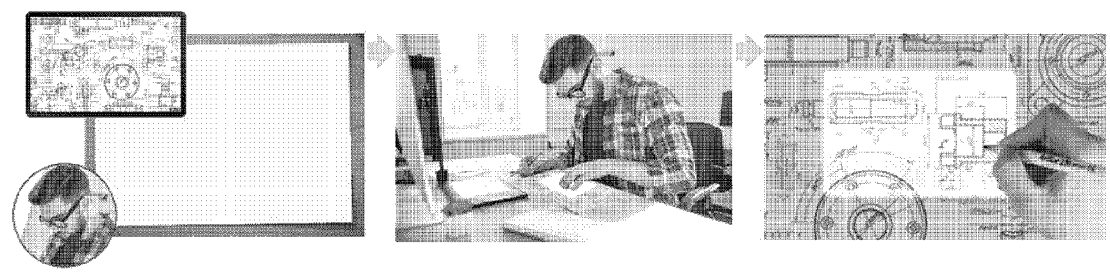

In another example, as shown in FIGS. 9A and 9B, by implementing the disclosed techniques, a user (e.g., kids) can clearly visualize and learn very easily by simply putting the drawing sheet over the display device and start tracing. For example, the user can learn different sizes and angles of objects on an existing sketch by tracing them understanding the different sizes of different objects. As another example, students can learn engineering drawing very easily by just putting the drawing sheet over the display device and start tracing. It is very easy to learn the different perspective of an engineering drawing (top, front, back view).

Figure 10A:
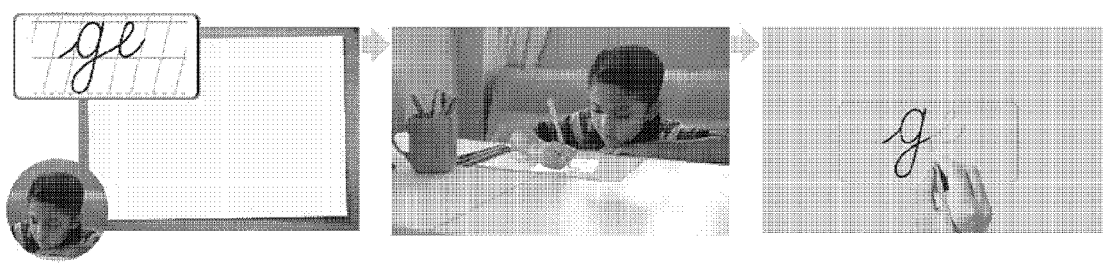
Figure 10B:
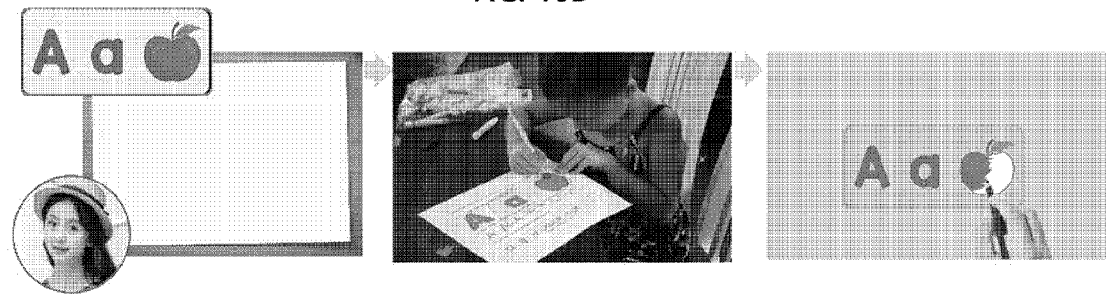

In another example as shown in FIGS. 10A and 10B, by implementing the one or more embodiments of the disclosure, a user (e.g., kids) can learn calligraphy very easily by just putting the drawing sheet over the display device and start tracing. The user can learn different form/styles/fonts of letters by using the disclosed techniques.

Figure 11:
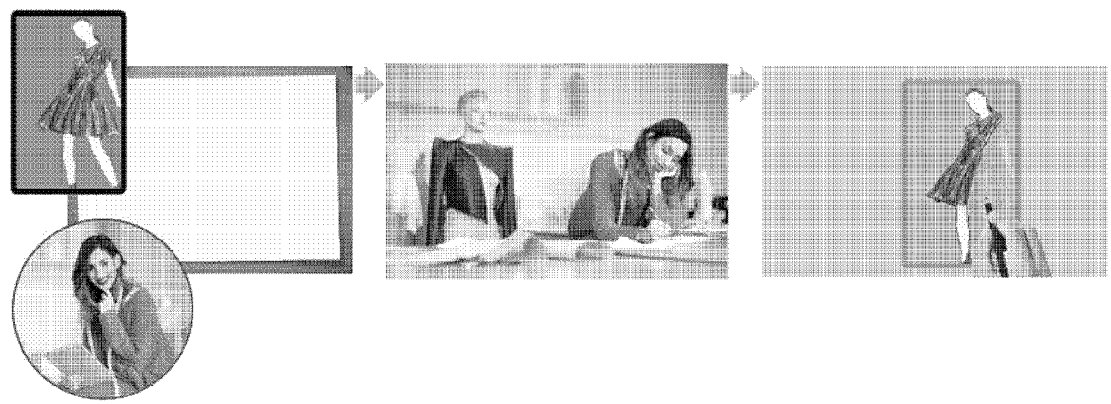

In another example shown in FIG. 11, by implementing the one or more embodiments of the disclosure, fashion designers can very easily draw each portion of a dress with some inspiration from other sources. For Example, a beautiful flower in a modern art could be easily drawn on the portion of a dress using the disclosed techniques.

Figure 12:
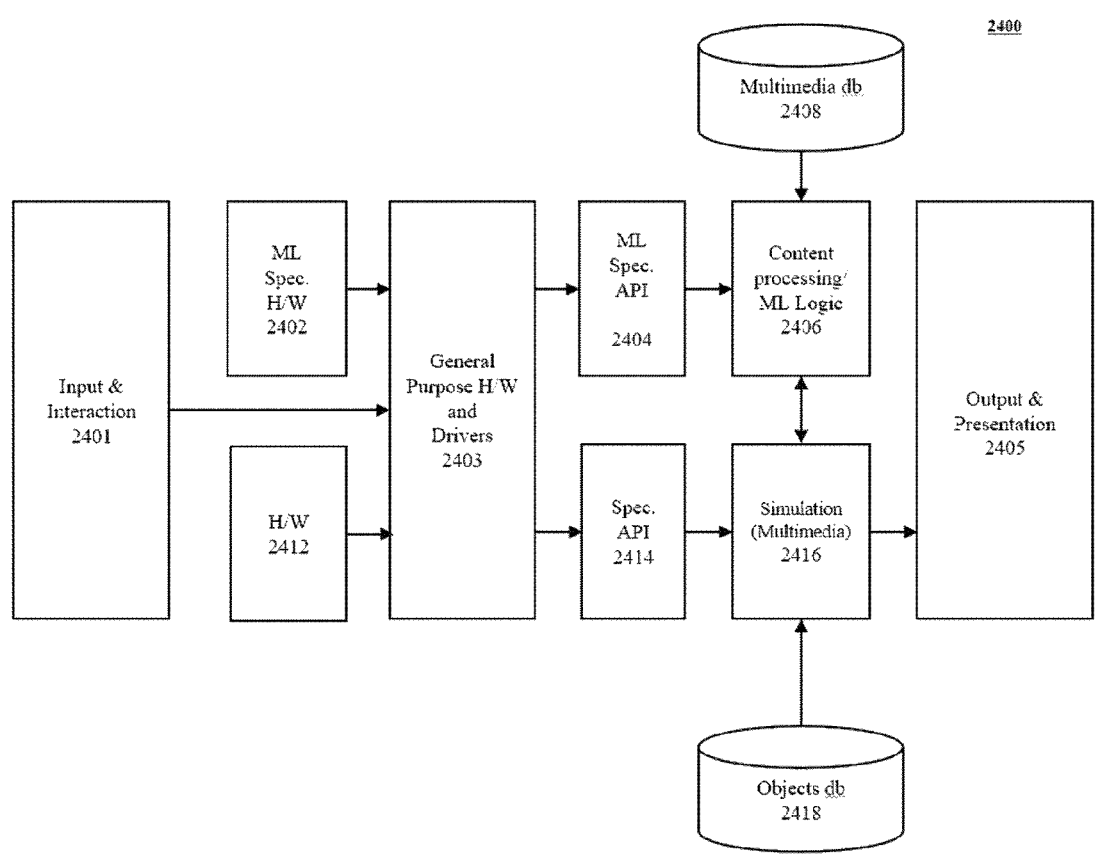
FIG. 12 illustrates another system architecture, according to an embodiment.
Figure 13:
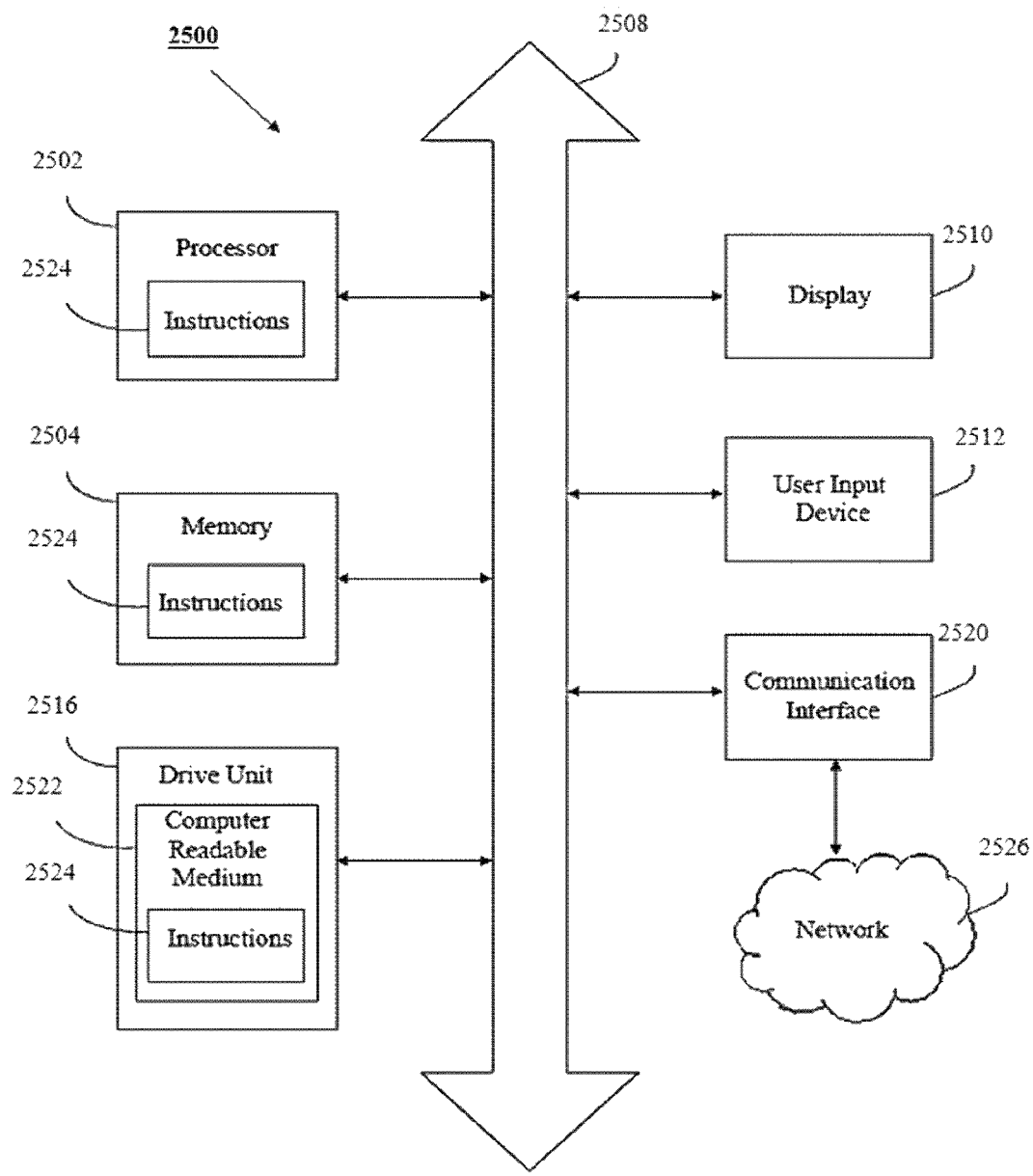
FIG. 13 illustrates a device according to an embodiment.

FIG. 12 illustrates a system architecture 2400 to provide tools and development environment described herein for a technical-realization of the implementation server, controller and nodes in the mesh network through a computing device. FIG. 13 is a non-limiting example of an electronic device, and it will be appreciated that many other architectures may be implemented to facilitate the functionality described herein. The architecture may be executing on hardware such as a computing machine 2400 of FIG. 13 that includes, among other things, processors, memory, and various application-specific hardware components.

The architecture 2400 may include an operating-system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as file-system (e.g., C standard library) that may provide functions such as memory allocation functions, string manipulation functions, mathematic functions, and the like. In addition, the libraries may include API libraries such as audio-visual media libraries (e.g., multimedia data libraries to support presentation and manipulation of various media format such as MPEG4, H.264, MP3, AAC, AMR, JPG, PNG), database libraries (e.g., SQLite that may provide various relational database functions), web libraries (e.g. WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Further, the system architecture 2400 depicts an aggregation of audio/video processing device based mechanisms and machine learning/natural language processing (ML/NLP) based mechanism in accordance with an embodiment. A user-interface defined as input and interaction 2401 refers to overall input. It can include one or more of the following—touch screen, microphone, camera etc. A first hardware module 2402 depicts specialized hardware for ML/NLP based mechanisms. In an example, the first hardware module 2402 may include one or more of neural processors, FPGA, DSP, GPU etc.

A second hardware module 2412 depicts specialized hardware for executing the data splitting and transfer. ML/NLP based frameworks and APIs 2404 correspond to the hardware interface layer for executing the ML/NLP logic 2406 based on the underlying hardware. In an example, the frameworks may be one or more or the following—Tensorflow, Café, NLTK, GenSim, ARM Compute etc. Simulation frameworks and APIs 2414 may include one or more of—Audio Core, Audio Kit, Unity, Unreal etc.

A database 2408 depicts a pre-trained database. The database 2408 may be remotely accessible through cloud by the ML/NLP logic 2406. In other example, the database 2408 may partly reside on cloud and partly on-device based on usage statistics.

Another database 2418 may be an object database including a memory. The database 2418 may be remotely accessible through cloud. In other example, the database 2418 may partly reside on the cloud and partly on-device based on usage statistics.

A rendering module 2405 is provided for rendering audio output and trigger further utility operations. The rendering module 2405 may be manifested as a display cum touch screen, monitor, speaker, projection screen, etc.

A general-purpose hardware and driver module 2403 may be the computing device 2500 as shown in FIG. 13, and instantiates drivers for the general purpose hardware units as well as the application-specific units (e.g., the first hardware module 2402 and the second hardware module 2412).

In an example, the ML mechanism underlying the system architecture 2400 may be remotely accessible and cloud-based, thereby being remotely accessible through a network connection. An audio/video processing device may be configured for remotely accessing the NLP/ML modules and simulation modules may comprise skeleton elements such as a microphone, a camera a screen/monitor, a speaker etc.

Further, at-least one of the plurality of modules of mesh network may be implemented through AI based on an ML/NLP logic 2406. A function associated with AI may be performed through the non-volatile memory, the volatile memory, and the processor constituting the first hardware module 2402 i.e. specialized hardware for ML/NLP based mechanisms. The processor may include one or a plurality of processors. One or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor 2502 of FIG. 13.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of a desired characteristic is made. "Obtained by training" means that a predefined operation rule or artificial intelligence model configured to perform a desired feature (or purpose) is obtained by training a basic artificial intelligence model with multiple pieces of training data by a training technique. The learning may be performed in a device (i.e. the architecture 2400 or the device 2500) itself in which AI according to an embodiment is performed, and/or may be implemented through a separate server/system.

The AI model may include a plurality of neural network layers. Each layer has a plurality of weight values, and performs a neural network layer operation through calculation between a result of computation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic 2406 is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

FIG. 13 illustrates an electronic device according to an embodiment. For example, the computer system 2500 may be one of the hardware configurations of the system architecture 2400. The computer system 2500 may include a memory that stores a set of instructions that can be executed by at least one processor to cause the computer system 2500 to perform any one or more of the embodiments described above. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (e.g., programmed).

The computer system 2500 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer system 2500 may include an input device 2512 configured to allow a user to interact with any of the components of system 2500. The computer system 2500 may also include a disk or optical drive unit 2516. The disk drive unit 2516 may include a computer-readable medium 2522 in which one or more sets of instructions 2524, e.g. software, can be embedded. Further, the instructions 2524 may embody one or more of the methods or logic as described above. In a particular example, the instructions 2524 may reside completely, or at least partially, within the memory 2504 or within the processor 2502 during execution by the computer system 2500.

The present disclosure contemplates a computer-readable medium that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or maybe a separate component. The communication port 2520 may be created in software or maybe a physical connection in hardware. The communication port 2520 may be configured to connect with a network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

While specific terms have been used to describe embodiments of the disclosure, the embodiments of the disclosure should not be construed as being limited to the aforementioned embodiments. It should be understood that any modification, replacement and/or equivalents thereof may be construed as falling within the inventive concept of the present disclosure.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The above-described embodiments are specific embodiments of the disclosure. It should be understood that a person of ordinary skill in the art may make improvements and modifications without departing from the scope of the present disclosure, and these improvements and modifications should be construed as falling within the protection scope of the present disclosure.

What is claimed is:

1. A system for adjusting brightness of a displayed content in a device, the system comprising:
   an imaging device for receiving a camera feed based on a visible-light;
   a light sensor for measuring a light sensor value indicating an intensity of the visible-light; and
   a processor configured to:
   detect a translucent surface over a display screen based on capturing a plurality of visible-light parameters from the camera feed and the light sensor value;
   predict a reflectance value of the translucent surface using an artificial neural network model based on the plurality of visible-light parameters and an input brightness level associated with the display screen;
   determine a proportionality of a change in at least one of a camera feed value and the light sensor value with respect to the input brightness level;
   verifying the reflectance value through a statistical function based on the determined proportionality; and
   determining an output brightness level for the display screen based on the reflectance value.

2. The system as claimed in claim 1, wherein the artificial neural network model further comprises:
   a plurality of convolution layers configured to:
   convolute raw image data captured by the imaging device to determine a reflected light and a transmitted light for the input brightness level based on the plurality of visible-light parameters; and
   predict the reflectance value of the translucent surface based on the reflected light;
   a plurality of logic gates module configured to iteratively fetch and store historical data pertaining to the plurality of visible-light parameters captured by the imaging device and the light sensor, and a plurality of brightness levels; and
   a feedback-and-cost function module configured to verify the predicted reflectance value based on a cost function acting as the statistical function.

3. The system as claimed in claim 2, wherein at least one condition of the cost function is determined according to at least one of:
   a combination of the reflected light and the transmitted light resulting back into a raw image; and
   a ratio of a change in the input brightness level that is proportional to a ratio of a change in the reflected light.

4. The system as claimed in claim 3, wherein the cost function is further determined based on:
   calculating a delta through an adder based on an execution of the at least one condition; and
   using the artificial neural network model to iteratively predict a revised reflectance of the translucent surface for minimizing the delta computed by the adder.

5. The system as claimed in claim 1, wherein the processor is further configured to:
   calculate a transmittance value of the translucent surface based on the reflectance value;
   determine an optimal brightness level for the display screen as the output brightness level based on at least one of the transmittance value and the reflectance value; and
   adjust display properties of the display screen based on the optimal brightness level.

6. The system as claimed in claim 1, wherein the processor is further configured to:
   detect a movement of the translucent surface on the display screen;
   calculate an offset value due to the movement of the translucent surface with respect to the display screen; and
   adjust the displayed content on the display screen based on the offset value.

7. The system as claimed in claim 6, wherein the processor is further configured to:
   receive a paper size and an aspect ratio of a digital image to be traced;
   scale the digital image based on a predefined aspect ratio of the display screen;
   notify a user for placing the display screen at a corner of the translucent surface;
   select a coordinate as an origin based on a position of the corner of the translucent surface;
   select one or more coordinates as alignment coordinates based on the movement of the translucent surface; and
   an alignment confirmation module configured to:
   notify the user to adjust an alignment of the display screen based on the movement of the translucent surface with respect to the display screen, wherein the digital image to be traced is adjusted with respect to the display screen based on the offset value.

8. A method for adjusting brightness of a displayed content in a device, the method comprising:
   receiving a camera feed based on a visible-light;
   measuring a light sensor value measured by a light sensor, the light sensor value indicating an intensity of the visible-light;
   detecting a translucent surface over a display screen based on capturing a plurality of visible-light parameters from the camera feed and the light sensor value;
   predicting a reflectance value of the translucent surface using an artificial neural network model based on the plurality of visible-light parameters and an input brightness level associated with the display screen;

determining a proportionality of a change in at least one of a camera feed value and the light sensor value with respect to the input brightness level;

verifying the reflectance value through a statistical function based on the determined proportionality; and determining an output brightness level for the display screen based on the reflectance value.

9. The method as claimed in claim 8, wherein the predicting the reflectance value of the translucent surface using the artificial neural network model comprises:

convoluting raw image data captured by an imaging device to determine a reflected light and a transmitted light for the input brightness level based on the plurality of visible-light parameters;

predicting the reflectance value of the translucent surface based on the reflected light;

iteratively fetching and store historical data pertaining to the plurality of visible-light parameters captured by the imaging device and the light sensor and a plurality of brightness levels; and verifying the predicted reflectance value based on a cost function acting as the statistical function.

10. The method as claimed in claim 9, wherein at least one condition of the cost function is determined according to at least one of:

a combination of the reflected light and the transmitted light resulting back into raw image; and a ratio of a change in the input brightness level that is proportional to a ratio of a change in the reflected light.

11. The method as claimed in claim 10, wherein the cost function is determined based on:

calculating a delta through an adder based on an execution of the at least one condition; and using the artificial neural network model to iteratively predict a revised reflectance of the translucent surface for minimizing the delta computed by the adder.

12. The method as claimed in claim 8, further comprising:

calculating a transmittance value of the translucent surface based on the reflectance value;

determining an optimal brightness level for the display screen as the output brightness level based on at least one of the transmittance value and the reflectance value; and adjusting display properties of the display screen based on the optimal brightness level.

13. The method as claimed in claim 8, further comprising:

detecting a movement of the translucent surface on the display screen;

calculating an offset value due to the movement of the translucent surface with respect to the display screen; and adjusting the displayed content on the display screen based on the offset value.

14. The method as claimed in claim 13, further comprising:

receiving a paper size and an aspect ratio of a digital image to be traced;

scaling the digital image based on a predefined aspect ratio of the display screen;

notifying a user for placing the display screen at a corner of the translucent surface;

selecting a coordinate as an origin based on a position of the corner of the translucent surface;

selecting one or more coordinates as alignment coordinates based on the movement of the translucent surface; and notifying the user to adjust alignment of the display screen based on the movement of the translucent surface with respect to the display screen, wherein the digital image to be traced is adjusted with respect to the display screen based on the offset value.

* * * * *